UNITED STATES PATENT OFFICE.

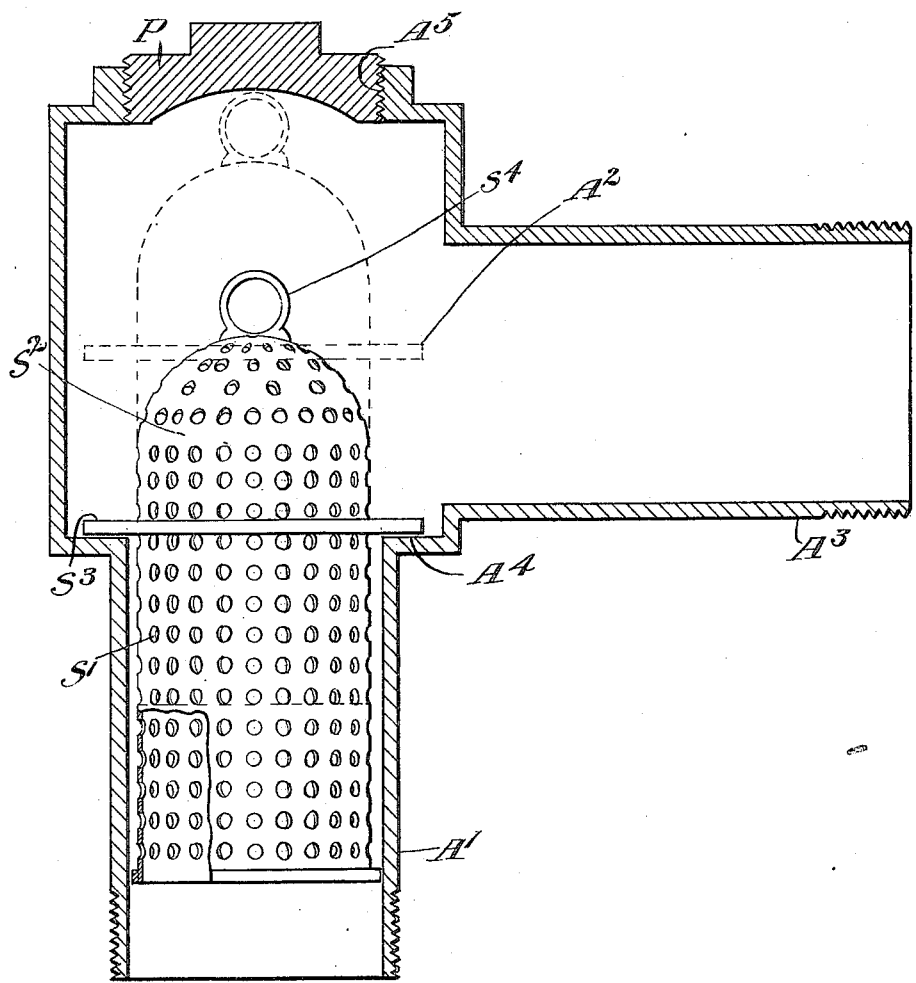

EDWARD C. KELLY, JR., OF BOSTON, MASSACHUSETTS, ASSIGNOR TO KELLY SEPARATOR COMPANY, OF BOSTON, MASSACHUSETTS, A CORPORATION OF MASSACHUSETTS.

STRAINER.

1,134,275.

Specification of Letters Patent.

Patented Apr. 6, 1915.

Application filed September 28, 1914. Serial No. 863,815.

*To all whom it may concern:*

Be it known that I, EDWARD C. KELLY, Jr., a citizen of the United States, and resident of Boston, in the county of Suffolk and State of Massachusetts, have invented new and useful Improvements in Strainers, of which the following is a specification.

My invention relates to screening or straining devices for use in conduit systems, and provides a strainer which automatically relieves the constriction due to accumulation of solid matter on the screening surface of the strainer, and also is to a substantial degree self-cleaning.

The drawing hereto annexed illustrates in section a form in which my invention may be embodied.

In this drawing, there is shown a casing, adapted to form part of a conduit system or pipe line, provided with an inlet branch A′, an outlet branch $A^3$, and a chamber $A^2$, intermediate between the two branches, in the sense that fluids passing from the inlet of the casing to its outlet, flow through this chamber. In the form of strainer device shown in the drawing, the inlet branch A′ is designed to be attached to the conduit system in a vertical position, so that the strainer itself, presently to be described, will tend to fall to its lowest possible position, and so that solid particles which have been arrested by the strainer will, if dislodged, fall back through the inlet, so that they may, if desired, be collected in a suitable mud chamber.

The strainer itself is composed of perforated or reticulated material and comprises a tubular portion S′, open at the end into which liquid flows on its way through the casing, and a hood part $S^2$, on the intermediate chamber end of the strainer. The tubular portion S′ is fitted to slide easily in the inlet channel A′. In the intermediate chamber $A^2$ there is formed an annular ledge $A^4$, on which the projection $S^3$, secured to the strainer just below its hemispherical hood part $S^2$, normally rests.

A suitable cap or plug P, secured into the aperture $A^5$ in the casing, serves to give access to the strainer when removed, and the strainer itself may be provided with a ring $S^4$, by the aid of which the strainer may the more easily be lifted out through the aperture $A^5$.

The operation of the straining device is as follows: Ordinarily, when the apertures in the hood part $S^2$ are clear, the flow of liquid through the casing will not lift the strainer from its normal lodgment on the ledge $A^4$, but when by accumulation of solid particles the hood part of the strainer becomes wholly or partially clogged, the pressure of the liquid will lift the strainer up into the intermediate chamber $A^2$ until a sufficient number of clear apertures in the tubular portions S′ have been unmasked, to allow the liquid to flow freely. An increase in the rate of flow of liquid over the normal will cause the screen to rise, even though its aperture be clear, and thus will automatically increase the effective area of apertures for passage of liquid. When the flow ceases, if the conditions be of intermittent flow, the strainer S′ $S^2$ will drop back to its lodgment, and in so doing will tend to disengage solid particles which have clung to it, and these will fall back through the inlet branch A′. A suitable mud drum or trap (not shown) may be provided to receive such dislodged particles.

The removal of the strainer S′ $S^2$ for cleaning is easily accomplished by taking off the cap P.

I claim:

1. In combination, a casing adapted to form part of a conduit system, said casing comprising inlet and outlet branches and a chamber intermediate between the said branches, a screen formed with a tubular part slidably mounted in the inlet branch of the casing, and a hood part at the outlet end of the same, said screen adapted to advance into the intermediate chamber of the casing in response to pressure exerted by fluid passing through the casing.

2. In combination, a casing adapted to form part of a conduit system, said casing comprising inlet and outlet branches and a chamber intermediate between the said branches, a screen formed with a tubular part slidably mounted in the inlet branch of the casing, and a hood part at the outlet end of the same, said screen adapted to advance into the intermediate chamber of the casing in response to pressure exerted by fluid passing through the casing, and means to limit movement of the screen into the inlet branch of the casing.

3. In combination, a casing adapted to form part of a conduit system, said casing comprising inlet and outlet branches and a chamber intermediate between the said branches, a screen formed with a tubular part slidably mounted in the inlet branch of the casing, and a hood part at the outlet end of the screen and provided with a projection adjacent to the hood part adapted to rest normally on a coöperating bearing in the casing, and said bearing, said screen adapted to advance in the intermediate chamber of the casing in response to pressure exerted by fluid passing through the casing.

4. In combination, a casing adapted to form part of a conduit system, said casing comprising inlet and outlet branches and a chamber intermediate between the said branches, a screen formed with a tubular part slidably mounted in the inlet branch of the casing, and a hood part at the outlet end of the same, said screen adapted to advance into the intermediate chamber of the casing in response to pressure exerted by fluid passing through the casing, and means to limit movement of the screen into the inlet branch of the casing, the screen normally resting on said limiting means.

Signed by me at Boston, Massachusetts, this twenty-fifth day of September, 1914.

EDWARD C. KELLY, Jr.

Witnesses:
 ODIN ROBERTS,
 RICHARD W. HALL.

Copies of this patent may be obtained for five cents each, by addressing the "Commissioner of Patents, Washington, D. C."